United States Patent [19]

Tryon

[11] 4,272,086
[45] Jun. 9, 1981

[54] ADJUSTABLE TAPER RING COLLAR

[76] Inventor: Erwin Tryon, 538 Jamaica Ave., Brooklyn, N.Y. 11208

[21] Appl. No.: 134,755

[22] Filed: Mar. 28, 1980

[51] Int. Cl.³ .............................................. B23B 31/40
[52] U.S. Cl. ...................................... 279/1 S; 279/2 R
[58] Field of Search ........................ 279/1 S, 2 R, 1 R

[56] References Cited
U.S. PATENT DOCUMENTS

| 2,488,822 | 11/1949 | McDonald | 279/1 S |
| 2,732,213 | 1/1956 | Drew | 279/1 S |
| 2,807,180 | 9/1957 | Adams | 279/1 S |
| 2,890,055 | 6/1959 | Garrison | 279/1 S |
| 3,199,881 | 8/1965 | Duxbury | 279/1 S |

*Primary Examiner*—William R. Briggs
*Attorney, Agent, or Firm*—Frishauf, Holtz, Goodman and Woodward

[57] ABSTRACT

An adjustable taper ring collar for use in manufacturing rings comprises a generally cylindrical member having a plurality of longitudinal slits therein, the sections of the cylindrical member between the longitudinal slits being expandable in the radial direction of the collar to retain a ring or the like thereon. An adjustment mechanism is provided on the collar and which is movable in the longitudinal direction of the collar for abutting against a side surface of a ring or the like at a plurality of spaced apart locations around the circumference of the ring in order to firmly support a ring around its entire circumference during machining of the ring.

6 Claims, 5 Drawing Figures

ABLE TAPER RING COLLAR

BACKGROUND OF THE INVENTION

This invention relates to ring collars for use in fabricating rings, such as rings made of gold, silver or other precious metals, and more particularly, to such a ring collar having an adjustable taper.

Prior art ring collars are either shaped specifically to conform to the shape of a given ring, or are made to accept cams, or the like, which cams have surfaces which conform to the side surfaces of the rings to be mounted on the ring collar. This necessitates a large amount of individual work and a high degree of craftsmanship to fabricate satisfactory ring collars providing suitable support around the complete circumference of the ring.

If the ring is not properly supported around its entire circumference, the tool being used to operate on the ring can slip and cause damage to the ring, the ring collar and/or the operator of the machine. Not only does this raise the risk of personal injury, but also economic injury since highly valuable items are generally worked on.

The object of the present invention is to provide an improved ring collar having an adjustable ring taper for accepting substantially any shape ring.

SUMMARY OF THE INVENTION

In accordance with the present invention, an adjustable taper ring collar comprises a generally cylindrical member having a plurality of longitudinal slits therein; means on the collar for receiving a ring or the like thereon, the sections between the longitudinal slits being expandable in the radial direction of the collar to retain the ring or the like on the collar; and means coupled to the collar and movable in the longitudinal direction of the collar for abutting against a side surface of the ring or the like at a plurality of spaced locations around the circumference of the ring or the like.

In a preferred arrangement, the movable means comprises a plurality of screws threadably coupled to the collar and threadably adjustable in the longitudinal direction of the collar. Such screws are preferably mounted in the vicinity of the sections of the collar between the longitudinal slits.

DETAILED DESCRIPTION

The adjustable taper ring collar of the present invention is useable on conventional jewelry making machines, such as the Posalux-Universal Faceting Machine, type FCT-U/D, manufactured by Posalux Ltd., Bienne, Switzerland; the Tousdiamants machine with a model T-4 head, manufactured by Tousdiamants, Meyrat, Switzerland, or other similar jewelry manufacturing machines. A detailed description of the machines in which the adjustable taper ring collar of the present invention may be used is not given herein since they are notoriously well known in the art.

Figure 3:
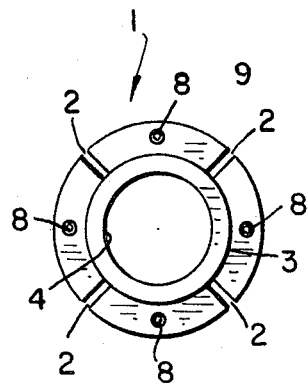
FIG. 3 is a left side view thereof.
Figure 1:
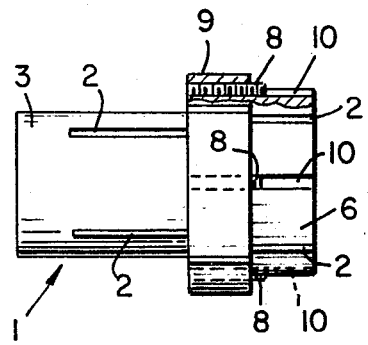
FIG. 1 is a side view of an adjustable taper ring collar according to the present invention.
Figure 2:
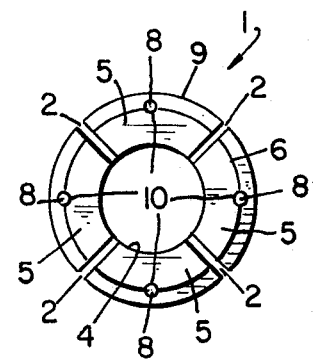
FIG. 2 is a right side view thereof.
Figure 4:
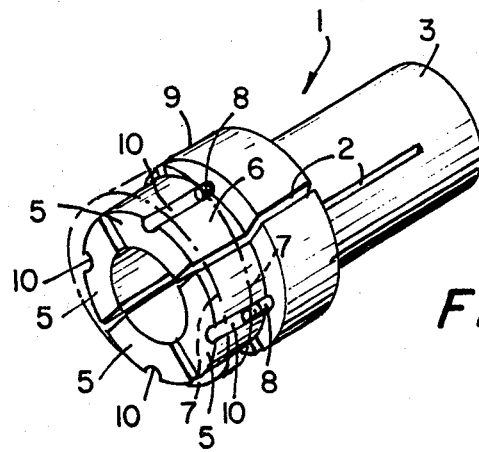
FIG. 4 is a perspective view thereof with a ring shown in chain lines mounted on the collar.

Referring to the drawings, an adjustable taper ring collar of the present invention comprises a generally cylindrical member 1 having a plurality of longitudinal slits 2 therein. The longitudinal slits 2 do not extend along the entire length of the collar 1. The left-hand portion 3 of the collar is adapted to be received in a chuck, or the like, of a machine. The collar has a longitudinal bore 4 therethrough which receives an expanding mechanism to cause the segments 5 between adjacent slits 2 to expand in the radial direction. The collar also has a turned down forward end portion 6 for receiving a ring thereon, for example as shown in FIG. 4. Since the ring has tapered side walls 7, the collar of the present invention is provided with a plurality of adjusting screws 8 threadably mounted in the intermediate section 9 of the collar. The forward section 6 of the collar has semi-circular grooves 10 formed therein and along which the screws 8 are adapted to travel. Preferably, the screws 8 have Allen head drive receptacles which are engaged from the left side as viewed in FIG. 1. The screws 8 preferably have one-half of their cross-sections received in the grooves 10, the other half of their cross-sections extending outwardly above the surface of the forward portion 6 of the collar. By threadably adjusting the position of the screws 8 in the collar, the screws 8 can be oriented to provide firm backing-up of the tapered portions of the ring, for example as shown in FIG. 4.

The number of longitudinal slits 2, and the longitudinal lengths thereof may be varied. The drawings illustrate a four-section split collar, although in some instances a six-section or eight-collar section may be more desirable, depending upon the particular type of rings or other articles of jewelry being operated on. Moreover, the number of screws 8 provided may be varied freely, depending upon the application. For most applications it has been found that four equidistantly arranged screws, as shown in FIGS. 1-4, is sufficient. As should be apparent, six, eight or any other number of screws could be used, and the spacing between screws could be varied.

Figure 5:
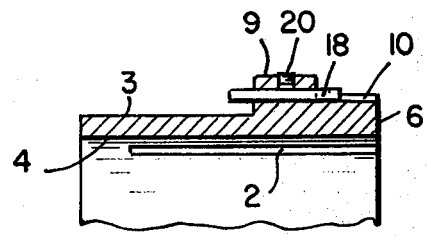
FIG. 5 is a partial view of a modified embodiment of the invention.

While screws 8 are shown and described, other adjusting elements could be used. For example, as shown in FIG. 5, thin-rod shaped members 18 may be longitudinally slidable through bores 19 in the flange 9 of the collar. Set screws 20 are threadably engaged in the flange 9 and are adapted to bear against the slidable rods 18 to retain them in place. While this arrangement is not as preferable as providing screws 8, which are more easily adjustable, it does provide a suitable alternative. It should be clear that the set screws 20 may also be provided to bear against the sides of screws 8 in FIG. 1 in order to more securely retain the screws 8 in position after they are set.

I claim:
1. An adjustable taper ring collar comprising: a generally cylindrical member (1) having a plurality of longitudinal slits (2) therein;
receiving means (6) on said generally cylindrical member (1) for receiving a ring, or the like, thereon, the sections (5) between said longitudinal slits (2) being expandable in the radial direction of said generally cylindrical member to retain said ring or the like on said collar;
at least said receiving means (6) having a plurality of longitudinal grooves (10) therein and distributed around the periphery thereof, said grooves (10) extending to the ring or the like receiving area of said receiving means (6); and a plurality of elongated abutment means (8, 18) adjustably coupled to said collar and having at least a part of their cross sections located in respective ones of said longitudinal grooves (10) at least in the vicinity of said receiving means (6) and being movable in the longitudinal direction of said collar for abutting against a side surface of said ring or the like at a plurality of spaced apart locations around the circumference of said ring or the like, said longitudinal grooves providing bearing surfaces for substantially preventing circumferentially directed movement of said abutment means (8,18) relative to said collar.

2. The adjustable taper ring collar of claim 1 wherein said abutment means comprises a plurality of screws threadably coupled to said collar and threadably adjustable in the longitudinal direction of said collar.

3. The adjustable taper ring collar of claim 1 or 2 wherein said abutment means are mounted in the vicinity of the sections of said collar between said longitudinal slits.

4. The adjustable taper ring collar of claim 1 wherein said abutment means comprises a plurality of rod-like members slideably mounted to said collar so as to be slideable in the longitudinal direction thereof.

5. The adjustable taper ring collar of claim 4 or 1 further comprising means for locking said abutment means relative to said collar so as to be longitudinally immovable in the longitudinal direction of said collar.

6. The adjustable taper ring collar of any one of claims 1, 2 or 4, wherein each of said abutment means are elongated members and have about one-half of their cross-sections received in respective longitudinal grooves (10).

* * * * *